Figure 1A:
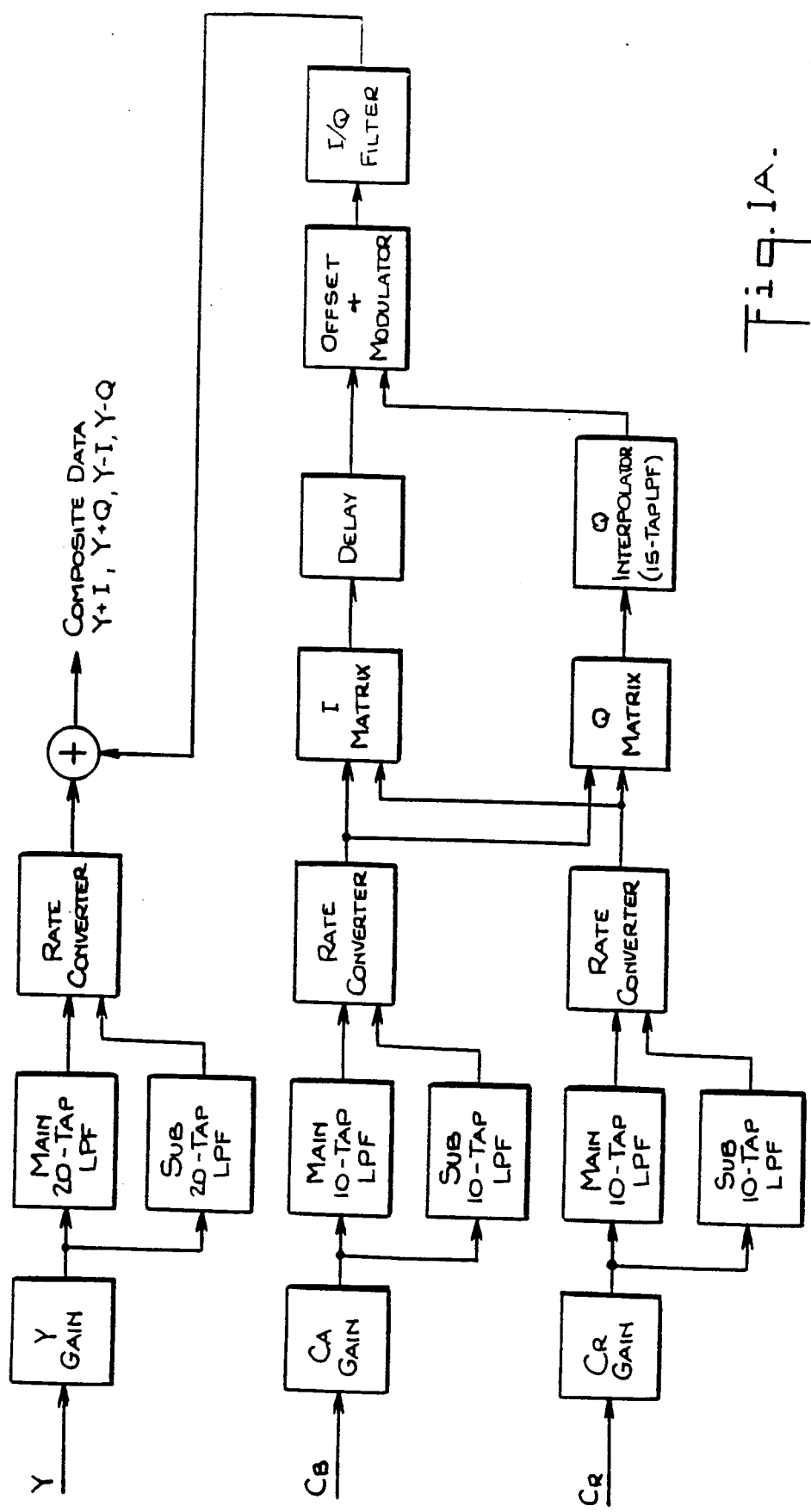

United States Patent [19]

Stec et al.

[11] Patent Number: 5,057,911
[45] Date of Patent: Oct. 15, 1991

[54] SYSTEM AND METHOD FOR CONVERSION OF DIGITAL VIDEO SIGNALS

[75] Inventors: Kevin Stec, Medford; Jerome D. Shields, Atco, both of N.J.

[73] Assignee: Matsushita Electric Industrial Co., Ltd., Osaka, Japan

[21] Appl. No.: 424,829

[22] Filed: Oct. 19, 1989

[51] Int. Cl.$^5$ .......................................... H04N 11/20
[52] U.S. Cl. ...................................... 358/11; 358/13
[58] Field of Search ................... 358/11, 13, 13 C, 22

[56] References Cited

U.S. PATENT DOCUMENTS 4,335,395 6/1982 Clarke .................................. 358/11
4,438,452 3/1984 Powers ................................. 358/11

Primary Examiner—James J. Groody
Assistant Examiner—Kim Yen Vu
Attorney, Agent, or Firm—Amster, Rothstein & Ebenstein

[57] ABSTRACT

A system converts digital video signals between two digital video signal formats. The system includes a rate converter which receives digital samples of the video signal in the first format and at the clock frequency thereof and converts those signls to digital samples of the video signal at the clock frequency of the second signal format. The outputs of the rate converter are combined with appropriate coefficients in a digital filter to produce alternately coefficient modified chorma and luminance signals which are combined in an output circuit to produce the digital video signal in the second video signal format.

3 Claims, 4 Drawing Sheets

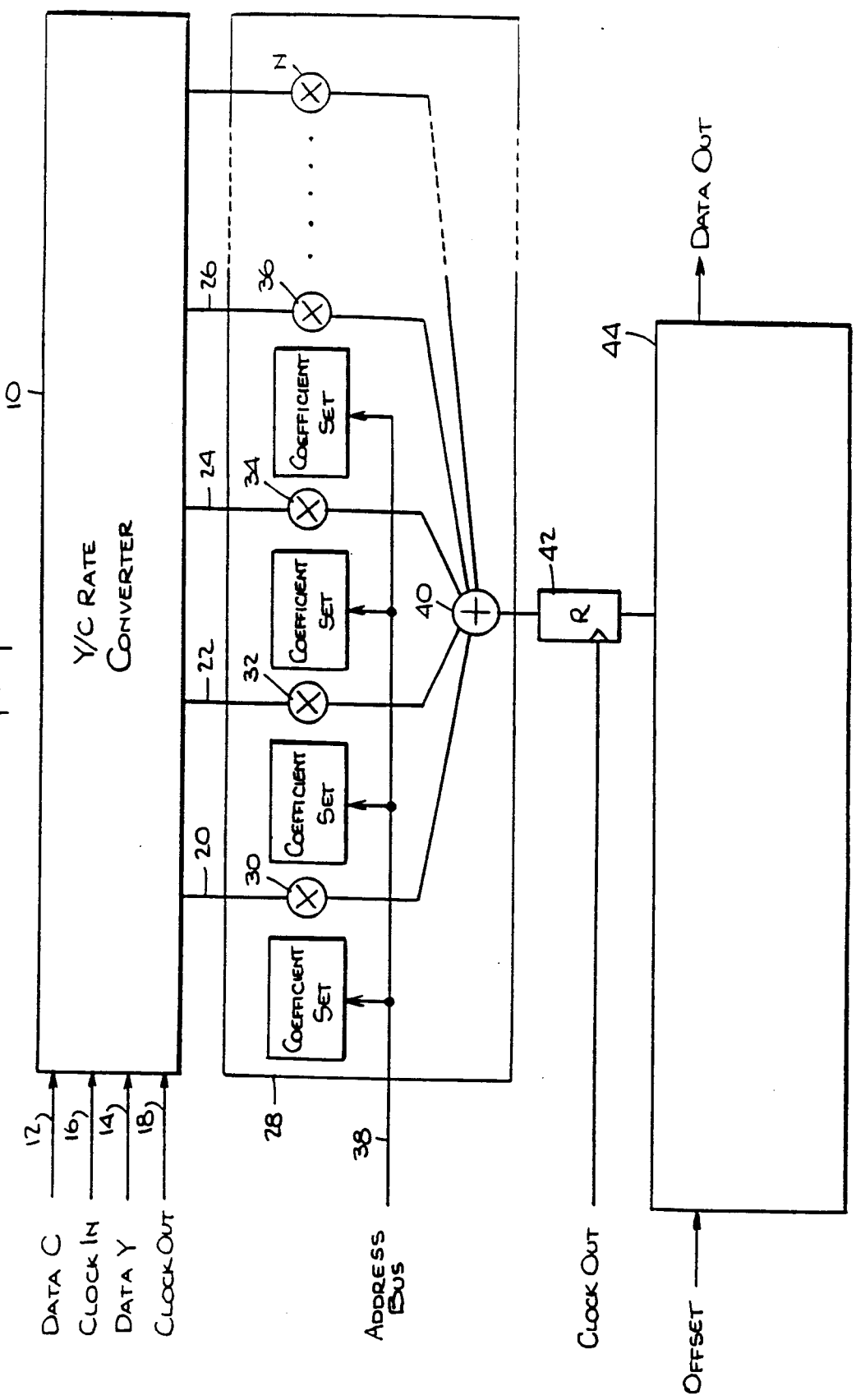

SYSTEM AND METHOD FOR CONVERSION OF DIGITAL VIDEO SIGNALS

The invention relates to a system and method for converting a digital video component signal to a digital video composite signal and for accomplishing part of the reverse conversion, namely, the conversion of a digital composite signal decoded into components to a digital component signal.

An international standard (known as D1) has been adopted for digital representation of a video component signal. Similarly, there is a growing consensus in the electronics industry as to a standard (known as D2) for a digital representation of a video composite signal.

By way of background, there are three levels of signals produced for color television. At the highest quality level, the video signal produced by the television camera has red (R), green (G), blue (B) signal components. At the next level, referred to as the component level, the video signals are referred to luminance (Y) and two chroma signals, a signal designated CR and a signal designated CB. At the lowest level, the video signals are in the NTSC (or PAL) format, which includes a luminance (Y) signal and two chroma signals, designated I (or U) and Q (or V). These are the digital NTSC (or PAL) components, where the chroma siqnals are modulated and added to the luminance signal to form the digital composite signal. As used herein, the term digital component signal refers to a digital representation of the color video signal at the component (Y, CR, CB) level, and the term digital composite signal refers to a digital representation of the color video signal at the composite (NTSC, PAL) level. It will be understood by those skilled in the art that the invention described and claimed herein is applicable for use in both the United States (NTSC) and European (PAL) color television systems, and references to the Y, CR, CB, I and Q signals and NTSC signal are for illustrative purposes only and should be understood to encompass the corresponding representations of the corresponding signals under the European standards.

There is a need to convert digital video signals between the video component (D1) signal format and the video composite (D2) signal format. The video component signal is a better quality signal and can be manipulated more easily than the video composite signal. Thus, the D1 signal format is usually used by professionals for production work to do such things as inserting computer graphics, resizing a picture, overlapping, matting and creating special effects. Once the production work is completed, the D1 signal format must be converted to the D2 signal format in order that the signal can be decoded by a television receiver. Similarly, if a video signal is in the D2 signal format, it would be converted to a D1 signal format for production work.

Conversion between the D1 signal format and the D2 signal format require several steps. Conversion from D1 to D2 is accomplished as follows:

Conversion from D1 to D2 is accomplished as follows:

1) Matrixing of D1 components to D2 components in accordance with the following mathematical relationship:

$$Y_{D2} = 0.625 \, Y_{D1} \tag{1}$$

$$I = 0.625 \, [(1.031) \, CR + (-0.477) \, CB] \tag{2}$$

$$Q = 0.625 \, [(0.669) \, CR + (0.730) \, CB] \tag{3}$$

2) Band limiting of the chroma components:
(a) low-pass filter I
(b) low-pass filter Q 3) Modulation of the 3.58 MHz carriers by the chroma components and forming of the composite signal:

$$NTSC \, COMPOSITE \, VIDEO = Y_{D2} + I \cos[2\pi(3.58MHz)t]$$

$$+ Q \sin [2\pi(3.58MHz)t]$$

Conversion from D2 to D1 is accomplished as follows:

1) Separation of the chroma and liminance information from the composite video signal and demodulation of the chroma information to obtain $Y_{D2}$, I, Q. This is accomplished by known signal processing techniques and cannot be easily described by equations.

2) Matrixing of D2 components to D1 components:

$$Y_{D1} = 1/0.625 \, Y_{D2} \tag{4}$$

$$CR = 1/0.625 \, [(0.681) \, I + (0.445) \, Q] \tag{5}$$

$$CB = 1/0.625 \, [(-0.624) \, I + (0.962) \, Q] \tag{6}$$

Problems arise when attempts are made to convert the video signals between the D1 siqnal format and the D2 signal format. The system for producing the D1 signal format uses a clock frequency of 13.5 MHz. On the other hand, the system for producing the D2 signal format uses a clock frequency of 14.318 MHz. Thus, in converting from one siqnal format to the other, the differences in clock frequencies must be taken into account. Due to the differences in clock frequency, some of the digital samples in one of the signals may be lost, requiring that interpolation techniques be used to prevent the loss of information. In addition, the chroma signal portion of the video signal in the D1 signal format has a bandwidth of 2.75 MHz, whereas the chroma signal portion of video signals in the D2 signal format has a maximum bandwidth of 1.3 MHz. Conversion from the D1 signal format to the D2 signal format therefore requires band limiting of the chroma signal.

The chroma signal has two components which must be combined during the conversion in the appropriate way according to the mathematical relationship set forth above to produce the proper chroma siqnals for the format into which the signal is to be converted. Differences in signal levels for each format must be taken into account by providing gain adjustments for the signals. Finally, in the conversion from the D1 signal format to the D2 signal format the chroma signal must be modulated and the resulting composite signal corrected for DC offset.

Figure 1B:
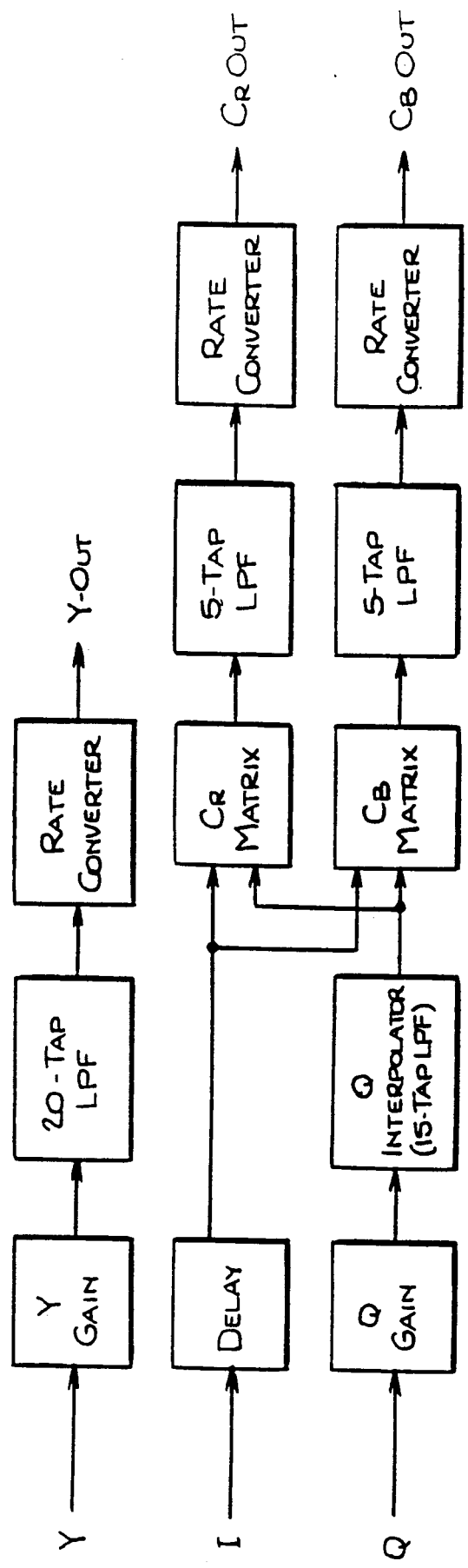

FIGS. 1A and 1B show prior systems which adopt a relatively direct approach to accomplish, respectfully, conversion of digital video signals between the D1 signal format and the D2 signal format and conversion of the digital video signal between the D2 signal format and the D1 signal format. In the D1 to D2 conversion, illustrated in FIG. 1A, the video signal is broken down into its luminance, Y, and individual chroma CB, CR signals. Each of these signals is applied to a gain correction circuit and thereafter to a pair of parallel connected low pass digital interpolation filters which provide the necessary digital samples of the D1 signal for the D2signal. Because of the difference in clock rates between the D1 and D2 signal formats, 35 output samples of the D1 signal are required for every 33 input samples. That difference in the number of samples is provided by the operation of the two parallel interpolation filters for each signal component. The three sets of signals from the interpolation filters are then passed to three rate converters, where they are reclocked to the 14.318 MHz clock frequency of the D2 signal format. The reclocked CR signals and the reclocked CB signals are both applied to I and Q matrix circuits, where the signals are combined to produce I and Q signals. The output from the Q matrix circuit is applied to a Q interpolation digital filter to move the Q sample to be in time with the next luminance sample. The output of the I matrix is applied to a delay circuit to compensate for the Q processing delay. The output from the delay circuit and from the Q interpolation digital filter are applied to an offset and modulator circuit such that alternate I and Q signals are multiplied by $-1$. The output of the offset and modulator is applied to a band limiting filter to limit the bandwidth of the chroma signal. The chroma output signal from the band limiting filter is applied to an adder circuit where it is added to the luminance signal output of the luminance rate converter to produce an output signal in the form:

$$Y+I, Y+Q, Y-I, Y-Q, \ldots$$

In converting from the D2 signal format to the D1 signal format (FIG. 1B), the individual Y, I and Q signals are again separately processed. The Q signal is applied, after gain correction, to an interpolation filter and thereafter to CR and CB matrix circuits. The I signal is passed through a delay circuit and also applied to the CR and CB matrix circuits. The output of each matrix circuit is applied to a low pass filter and thereafter reclocked in a rate converter to the frequency of the D1 signal format to produce the CR and CB chroma signals. The Y signal, after gain correction, is applied to a low pass filter and then is reclocked in a rate converter to the frequency of the D1 signal format to produce the Y signal for the D1 signal format.

These prior art systems require a relatively large amount of hardware. They also require a different hardware configuration for the D1 to D2 signal conversion and the D2 to D1 signal conversion. It is one objective of the present invention to provide a system for conversion between the D1 and D2 signal formats which eliminates much of the hardware previously required and which uses the same hardware configuration to effect conversion from the D1 to the D2 signal format and from the D2 to the D1 signal format.

These and other objects and features are realized in accordance with the present invention in which the chroma signal and the luminance signal are applied to a luminance/chroma rate conversion circuit which converts the data rate from the input signal format (e.g., D1) to the output signal format (e.g., D2). The output of the rate converter is applied to the taps of a digital filter. Each tap of the digital filter is also coupled to a circuit which is controlled to provide a selected coefficient to each tap for combination with the output of the rate converter applied to that tap. The outputs of the taps are then combined to produce the converted signal.

Figure 3:
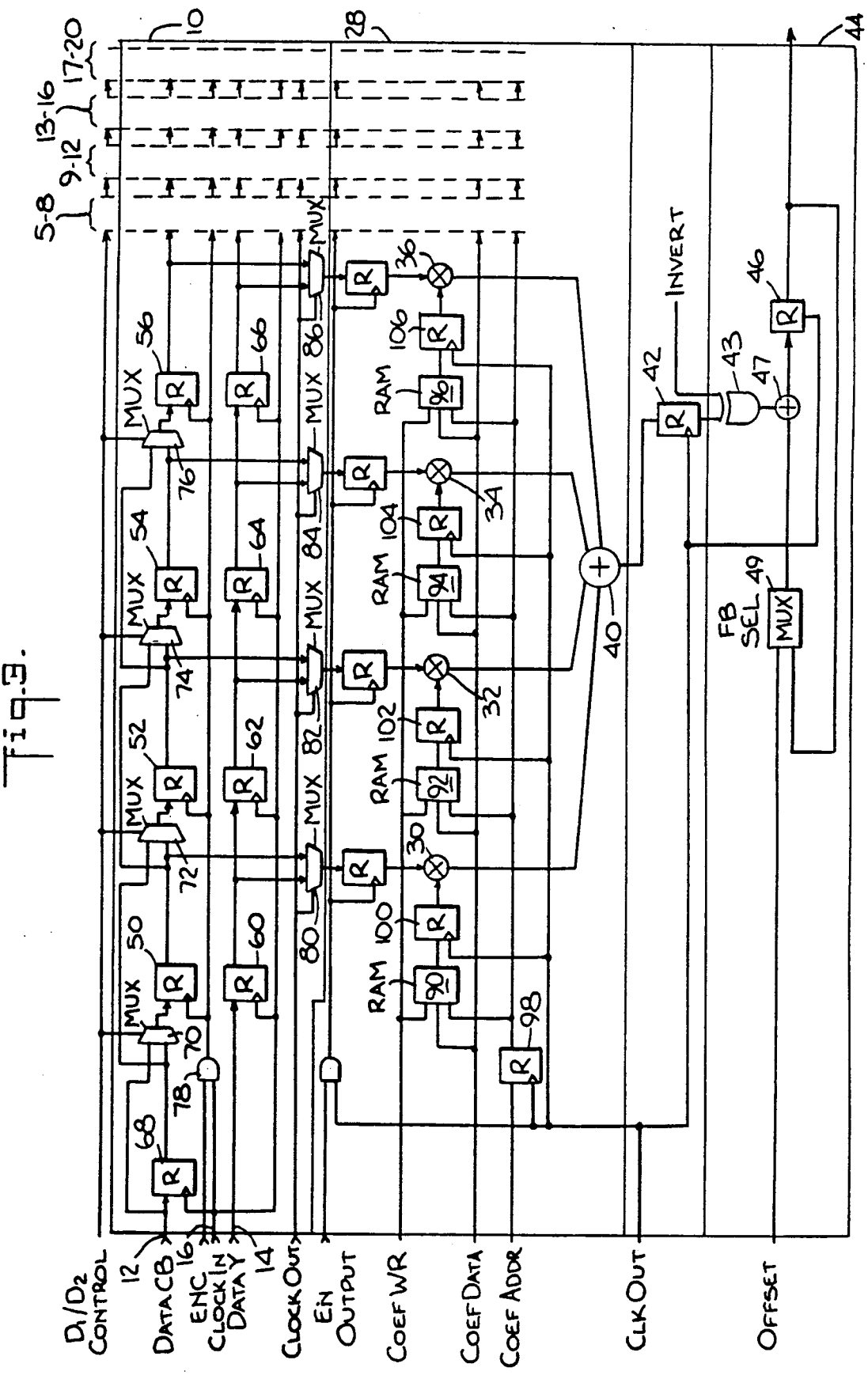

In converting from the D1 signal format to the D2 signal format, account must be taken of the fact that the luminance signal occurs at a rate which is twice the rate of occurrence of the chroma signal. According to the present invention, the chroma signal is shifted two positions in the rate converter for each clock cycle. That problem does not arise when converting from the D2 signal format to the D1 signal format. These and other objects and features of the invention will become more apparent from the following description of a presently preferred embodiment of the invention taken in conjunction with the drawings in which:

FIGS. 1A and 1B are, respectively, block diagrams of prior art systems for converting from the D1 signal format to the D2 signal format (FIG. 1A) and from the D2 signal format to the D1 signal format (FIG. 1B);

FIG. 2 is a block diagram of the system for converting a digital video signal between the D1 and D2 signal formats (less the D2 decoder) in accordance with the present invention; and FIG. 3 is a detailed diagram of the electronic components of the system shown in FIG. 2. Referring to FIG. 2, which will first be described with respect to a conversion between D1 signal format and the D2 signal format, the system includes luminance/chroma (Y/C) rate converter 10, which receives as its inputs: the two chroma signals, CR, CB, on Data C line 12, the luminance signal, Y, on Data Y line 14, as well as the CLOCK IN signal on line 16 and the CLOCK OUT signal on line 18. It will be understood that references to the "input" signal refer to the original signal, which in the present example is the D1 signal, and references to the "output" signal refer to the signal to which the original signal is converted, which in the present example is the D2 signal. The CLOCK IN frequency is 13.5 MHz of the D1 signal and the CLOCK OUT signal frequency is twice the 14.318 MHz of the D2 signal due to the multiplexed processing of the luminance and chroma data.

The outputs of rate converter 10, which are the rate converted samples of the luminance and chroma signals, are applied via output lines 20, 22, 24, 26 ... to taps 30, 32, 34 36 ..., respectively, of digital filter 28. The signals which appear at the output of rate converter 10 are alternately samples of the luminance signal and samples of the two components, CR, CB, of the chroma signal. The other input to each tap in the digital filter is controlled, via address bus 38, to provide a particular coefficient to each tap which is dependent upon the input to that tap from the rate converter and which are required for the particular sample output signals which appear on the output lines from rate converter 10 to create the output signal in the D2 signal format. The coefficients are determined by first designing those digital low pass filters to meet both the interpolation and band pass requirements of each D2 component. This can be done utilizing well known techniques for synthesizing Finite Impulse Responses (FIR) digital filters. Next, the coefficients are scaled by the matrix factors for $Y_{D2}$, I and Q. The coefficients are then divided into 35 luminance groups, 70 I groups and 70 Q groups representing every possible interpolation phase of the outputs. Each group of coefficients is adjusted for frequency response matching among the different interpolation phases of each interpolating filter. The coefficients are then organized into memory blocks for each filter tap. One coefficient from every Y group goes into each block while one coefficient from each I and Q group that have CR matrix factors are included in the odd blocks and one coefficient from each I and Q group that have CB matrix factors are included in the even blocks. This results in 105 coefficients in every block corresponding to every output interpolation phase of Y, I and Q.

The operation of rate converter 10 presents either samples of the luminance signal on each of its output lines or samples of the CB and CR chroma signals on alternate output lines. Furthermore, the CB and CR chroma signals always appear on the same output line. For example, the CB chroma signal would always appear on output lines 20, 24 ... and the CR chroma signal would always appear on output lines 22, 26 ...

The output of taps 30, 32, 34, 36 ..., which are either coefficient modified luminance signals or coefficient modified chroma signals, are applied to adder 40. The outputs of adder 40 are the sequence of digital signals: Y, I, Y, Q, Y, I, ..., which are input to register 42, controlled at the CLOCK OUT frequency. The output register 42 is applied to output circuit 44 which combines the signals to produce an output signal on the DATA OUT line in the form:

$$Y+I, Y+Q, Y-I, Y-Q, \ldots$$

FIG. 3 shows four of the twenty identical stages of the embodiment of the invention, as well as additional details of the system shown in FIG. 2. Referring to FIG. 3, Y/C rate converter 10 includes chroma registers 50, 52, 54, 56 ... which receive the chroma data signals on the DATA C line 12. Similarly, luminance registers 60, 62, 64, 66, ..., receive the luminance data signals on the DATA Y line 14. In order to have proper timing of the luminance and chroma data signals in the rate converter to effect conversion of the D1 signal to the D2 signal, the outputs of the same chroma registers must be controlled such that chroma registers store the same type chroma (i.e., either the CB or the CR signals) signals when information is retrieved from the chroma registers. For example, when information is retrieved from the chroma registers, registers 50, 54 ..., store CB chroma data signals and chroma registers 52, 56 ..., store CR chroma data signals. Thus, functionally, one group of chroma registers, e.g., chroma registers 50, 54 ..., are CB registers, and the group of adjacent chroma registers, i.e., chroma registers 52, 56 ..., are CR registers. To this end, rate converter 10 also includes register 68 which receives the chroma data signal input from line 12 and multiplexer (MUX) circuits 70, 72, 74, 76 .., controlled via the D1/D2control lines as explained in further detail below. Due to timing considerations, each chroma registers 50, 52, 54, 56 ... and each luminance registers 60, 62, 64, 66 ... is a bi-phase shift register with each phase operating 180° out of phase with the other phase, as would be understood by a worker skilled in this field.

The luminance registers 60, 62, 64, 66 ..., are clocked at the CLOCK IN frequency of the D1 signal, namely, 13.5 MHz. The CLOCK IN signal is also applied to enable gate 78, the other input to which an ENABLE C signal causinq the output of gate 78 which is connected to control chroma registers 50, 52, 54, 56 ..., to produce a chroma clock signal at one half (6.75 MHz) the frequency of the CLOCK IN signal. On the other hand, chroma data is being applied to the chroma registers via register 68, which is clocked at the frequency of the CLOCK IN signal. In effecting conversion of the D1 signal to the D2signal, the control signal on the D1/D2control line is set such that the output of each MUX 70, 72, 74, 76 which is input, respectively, to its associated register 50, 52, 54, 56 ..., is applied to the register at one half the frequency of the CLOCK IN signal.

Y/C rate converter 10 also includes multiplexer (MUX) circuits 80, 82, 84, 86 ..., whose inputs are coupled to receive the outputs, respectively, from their associated registers: 50, 60; 52, 62; 54, 64; 56, 66; ... MUX circuits 80, 82, 84, 86 ... are switched at the frequency of the D2 signal, namely, 14.318 MHz, that is, one-half the CLOCK OUT frequency. It will now be apparent to a worker skilled in the art that each time a MUX circuit 80, 82, 84, 86 ... is connected to receive an input from a chroma register, that the chroma register will provide the same type of chroma signal, that is, a CR or CB chroma signal.

More specifically, and by way of example, when MUX circuits 80, 82, 84, 86 ... are clocked to receive inputs from the chroma registers, chroma registers 50, 54, ... always provide CB chroma signals to MUX circuits 80, 84 ..., and chroma registers 52, 56 ... always provide CR chroma signals to MUX circuits 82, 86 ... Thus, the outputs from MUX circuits 80, 84 ... are a data stream consisting of the signals Y, CB, Y, CB ... and the outputs from MUX circuits 82, 86 ... are a data stream consisting of the signals Y, CR, Y, CR ... Those outputs are input to taps 30, 32, 34, 36, ... The other inputs to taps 30, 32, 34, 36 come from the coefficient setting circuits, each of which includes a random access memory 90, 92, 94, 96 ... and an associated register 100, 102, 104, 106 ... The random access memories are controlled via an address (COEF ADDR) bus via register 98, a data (COEF DATA) bus and a write (COEF WR) line. The purpose of the coefficient setting circuits is to provide the particular coefficient to be assigned to the data signal input to the associated taps at a particular point in the processing of the data signals in-order to produce output signals which conform with the new (i.e., D2) signal format. Initially, the coefficient data is written to each coefficient memory block by applying the data serially to the COEF DATA bus where its location is specified by the COEF ADDR bus as controlled by the COEF WR line. Thereafter, the COEF ADDR bus is used to select the appropriate set of coefficents to be multiplied with the data signal input in their associated taps to produce the desired output phase.

The output of taps 30, 32, 34, 36 ... are applied to adder circuit 40, the output of which is alternately: $Y_{D2}$ (equation 1); I (equation 2); $Y_{D2}$; Q (equation 3); $Y_{D2}$ ... The output of adder 40 as applied to register 42 and then to output circuit 44 where the output of register 42 is applied to gate 43. The output of gate 43 is input to adder 47 which receives as its other input the output of multiplexer MUX. 49. The output of adder 47 is input to output register 46 which is clocked at the CLOCK OUT frequency. The output of register 46 is fed back as one input to the multiplexer 49, the other inputs being the OFFSET data bus and FB SEL. The Feedback Select (FB SEL) line selects the OFFSET data bus when register 42 holds a Y signal which provides a DC offset signal to maintain the proper reference black level to be added to the output of register 42 in multiplexer 47 to produce (Y + offset) signal. When register 42 holds a I or Q result, FB SEL selects the output register 46 which holds (Y + offset) signal to be added to the I or Q result in adder 47. In addition, the INVERT line is used to alternatively invert I and Q outputs to produce the sequence Y + offset, Y + offset + I, Y + offset, Y offset + Q, Y + offset, Y + offset - I, Y + offset, Y + offset − Q ... at the DATA OUT bus which produces an output on the DATA OUT line, which is alternately: Y+I; Y+Q; Y−I; Y−Q; Y+I ....

To convert from the D2 signal format, where the composite data has previously been separated in the NTSC components of Y, I and Q, to the D1 signal format the same circuitry is used as for the D1 to D2 signal conversion, with the following minor changes in operation, which would be apparent to a worker skilled in the art based upon the foregoing explanation of the operation of the invention. Referring to FIG. 3, the D1/D2 control signal is changed to enable MUX circuits 70, 72, 74, 76 ... at the CLOCK IN signal frequency. The output from each chroma register 50, 52, 54, 56 ... is alternately I, Q, I, ... data signals. The output of each MUX circuit 80, 82, 84, 86 ... is thus alternately Y, I, Y, Q, Y, I, ... data signals. The coefficient data applied to aps 30, 32, 34, 36 ... is changed in accordance with the desired output phase such that the output of each tap 30, 32, 34, 36 ... is alternately: Y, Y, Y, Y, ... and I, Q, I, Q, ... Those signals are applied to adder 40, the output of which is the sequence of data signals Y, CR, Y, CB ... Those signals are applied to the DATA OUT line via register 42 and output circuit 44. The FB SEL line remains in the external input bus position so the values on the OFFSET bus are added to each output of register 42. The INVERT line remains in the non-inverting position. The sequence produced at the DATA OUT bus is Y + offset, CR + offset, Y + offset, CB + offset .... Since the remaining operation of the circuits to convert from the D2 to D1 signal formats would be apparent to a worker skilled in the art, further explanation is unnecessary.

What has been described is a presently preferred embodiment of the invention. Those skilled in the art will recognize that changes and modifications can be made while remaining within the spirit and scope of the invention as set forth in the appended claims. For example, as noted above, this system can be used for both the United States and European color video standards.

What I claim is:

1. A system for converting a digital video signal from a first signal format to a second signal format comprising:

(a) a plurality of first registers for receiving the chroma components of the digital video signal in the first signal format applied thereto at the clock frequency of the first signal format;

(b) a plurality of second registers for receiving the luminance components of the digital video signal in the first signal format applied thereto at the clock frequency of the first signal format;

(c) means coupled to receive alternately the outputs of said first and second sets of registers to produce at the output thereof data samples of the chroma and luminance components of the digital video signal at the clock frequency of said second signal format;

(d) means for providing coefficient data signals;

(e) means for receiving coefficient data signals and said data samples of the chroma and luminance components of the digital video signal at the clock frequency of said second signal format to produce alternately coefficient modified chroma and luminance components for said video signal in said second signal format; and (f) means for combining said coefficient modified chroma and luminance components to produce chroma and luminance signals in said second signal format.

2. A system for converting a digital video signal from a first signal format to a second signal format comprising:

(a) rate converter means responsive to data samples of chroma and luminance components of the digital video signals in the first signal format applied to said rate converter at a first clock frequency for providing as rate converter output data signals data samples o said chroma and luminance components of the digital video signal at a second clock frequency, said rate converter output data signals being alternately data samples of said chroma and luminance components of the digital video signal;

(b) means of providing coefficient data signals required for the conversion of the digital video signal format from said first signal format to said second signal format;

(c) means responsive to said rate converter output data signals and said coefficient data signals for providing alternately coefficient modified chroma and luminance components for said digital video signal in said second format; and (d) means responsive to said alternate coefficient modified chroma and luminance signals for producing an output signal on digital video signal in said second signal format.

3. The system of claim 2 wherein said rate converter mean includes a plurality of first means for receiving the data sample of the chroma signals in the first digital video signal in the first signal format and a plurality of second means for receiving the data samples of the luminance signals in the digital video signal in the first signal format.

* * * * *

UNITED STATES PATENT AND TRADEMARK OFFICE
CERTIFICATE OF CORRECTION

PATENT NO. : 5,057,911
DATED : October 15, 1991
INVENTOR(S) : Stec, et al.

It is certified that error appears in the above-identified patent and that said Letters Patent is hereby corrected as shown below:

Column 7, line 18, delete "aps" and insert -- taps --.

Column 7, line 20, delete "Y, Y,".

Column 7, line 21, delete "Y, Y, ... and I, Q, I, Q, ..."
and insert -- Y, CB, Y, CR --.

Column 7, line 23, change "Y, CR, Y, CB" to
-- Y, CB, Y, CR --.

Column 7, line 29, delete "CR + offset" and insert
-- CB + offset --.

Column 7, line 30, delete "CB + offset" and insert
-- CR + offset --.

Signed and Sealed this

Eighteenth Day of October, 1994

Attest:

BRUCE LEHMAN

Attesting Officer
Commissioner of Patents and Trademarks